US008564855B2

(12) United States Patent
Hiberty et al.

(10) Patent No.: US 8,564,855 B2
(45) Date of Patent: Oct. 22, 2013

(54) METHOD FOR THE THREE-DIMENSIONAL DIGITIZATION OF BOOKS USING TERAHERTZ RADIATION

(75) Inventors: Bruno Hiberty, Pessac (FR); Patrick Mounaix, Talence (FR); Emmanuel Abraham, Talence (FR); Cédric Aguerre, Talence (FR); Pascal Desbarats, Talence (FR)

(73) Assignees: I2S, Pessac (FR); Centre National de la Recherche Scientifique, Paris (FR)

( * ) Notice: Subject to any disclaimer, the term of this patent is extended or adjusted under 35 U.S.C. 154(b) by 89 days.

(21) Appl. No.: 13/127,674

(22) PCT Filed: Nov. 4, 2009

(86) PCT No.: PCT/FR2009/052131
§ 371 (c)(1),
(2), (4) Date: Aug. 10, 2011

(87) PCT Pub. No.: WO2010/052427
PCT Pub. Date: May 14, 2010

(65) Prior Publication Data
US 2011/0292472 A1 Dec. 1, 2011

(30) Foreign Application Priority Data
Nov. 5, 2008 (FR) .................................. 08 57524

(51) Int. Cl.
*H04N 1/04* (2006.01)
(52) U.S. Cl.
USPC .......................................... 358/479; 358/474
(58) Field of Classification Search
None
See application file for complete search history.

(56) References Cited

U.S. PATENT DOCUMENTS

| 5,184,212 A * | 2/1993 | Yamamoto et al. ............ 348/234 |
| 6,845,074 B1 * | 1/2005 | Fujita .......................... 369/59.17 |

(Continued)

FOREIGN PATENT DOCUMENTS

| EP | 1169847 | * 9/2002 |
| WO | WO 2005/119572 | 12/2005 |

OTHER PUBLICATIONS

International Search Report as issued for PCT/FR2009/052131.

(Continued)

*Primary Examiner* — Vincent Rudolph
*Assistant Examiner* — Frantz Bataille
(74) *Attorney, Agent, or Firm* — Pillsbury Winthrop Shaw Pittman, LLP

(57) ABSTRACT

A process for digitizing closed books without having to open them, of printed documents or manuscripts, bound or in batches, without having to separate them, using an imaging system of a three-dimensional object by Terahertz waves including acquiring by an THz acquisition subsystem a set of three-dimensional low-resolution images representative of this object and obtained by application of shifts orthogonal three-dimensional in translation according to which the object and the THz acquisition subsystem are relatively shifted relative to each other, a process in which, during these three-dimensional shifts, the amplitude of the relative shift in each of these three dimensions is less than the spatial resolution of the THz acquisition subsystem in each of these three dimensions and a three-dimensional super-resolution processing step is provided, capable of generating a super-resolved 3D image from a linear combination of 3D low-resolution images and an image-restoration step capable of generating a restored super-resolved 3D image from deconvolution by the point spread function calculated from the 3D super-resolution image.

5 Claims, 5 Drawing Sheets

(56) References Cited

U.S. PATENT DOCUMENTS

Figure 1:
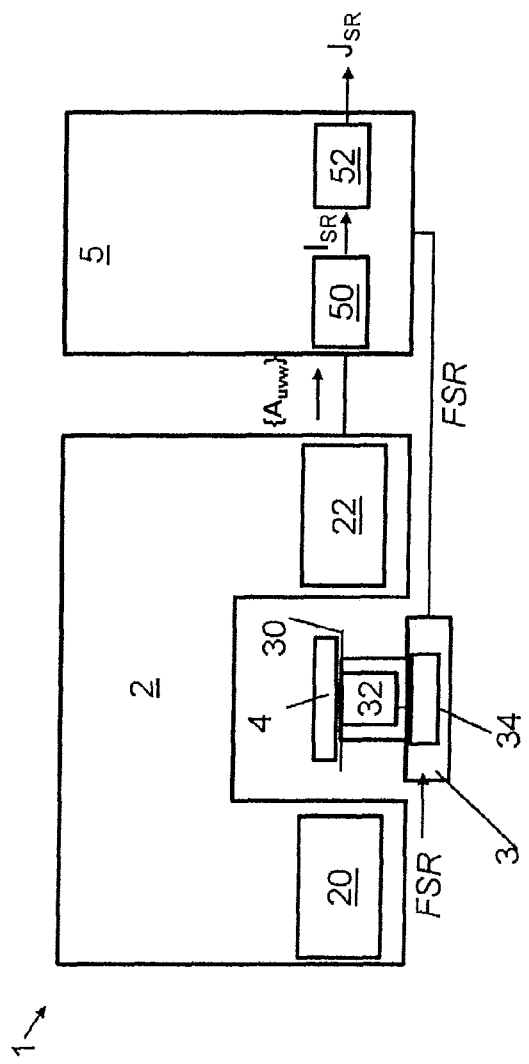

| | | | |
|---|---|---|---|
| 7,119,339 B2 | 10/2006 | Ferguson et al. | |
| 2004/0051913 A1 | 3/2004 | Pedley et al. | |
| 2004/0161165 A1* | 8/2004 | Riley et al. | 382/294 |
| 2005/0023470 A1* | 2/2005 | Ferguson et al. | 250/358.1 |
| 2006/0219922 A1* | 10/2006 | Watanabe et al. | 250/341.8 |
| 2007/0003155 A1* | 1/2007 | Miller et al. | 382/254 |
| 2007/0014471 A1* | 1/2007 | Simanovsky et al. | 382/170 |
| 2007/0030536 A1 | 2/2007 | Yan | |
| 2007/0091385 A1* | 4/2007 | Yan | 358/474 |
| 2007/0188668 A1* | 8/2007 | Pan et al. | 349/23 |
| 2007/0195921 A1* | 8/2007 | Ouchi | 378/1 |
| 2007/0235658 A1* | 10/2007 | Zimdars et al. | 250/390.07 |
| 2007/0257194 A1* | 11/2007 | Mueller | 250/341.8 |
| 2008/0088888 A1 | 4/2008 | Yan | |

OTHER PUBLICATIONS

Peled et al.; "Superresolution in MRI: Application to Human White Matter Fiber Tract Visualization by Diffusion Tensor Imaging", Magnetic Resonance in Medicine, Academic Press, Duluth, MN, US, vol. 45, No. 1.; Jan. 1, 2001, pp. 29-35.

Withayachumnankul et al.; "T-Ray Sensing and Imaging", Proceedings of the IEEE, IEEE, New York, US, vol. 93., No. 8; Aug. 1, 2007, pp. 1528-1558.

Mittleman et al.; "T-Ray Imaging", IEEE Journal of Selected Topics in Quantum Electronics, IEEE Service Center, Piscataway, NJ, US, vol. 2, No. 3; Sep. 1, 1996, pp. 679-692.

Woolard et al., "Terahertz Frequency Sensing and Imaging: A Time of Reckoning Future Application?" Proceeding of the IEEE, vol. 93, No. 10; Oct. 2005, pp. 1722-1743.

Poletto et al., "Enhancing the Spatial Resolution of a Two-Dimensional Discrete Array Detector", Optical Engineering, vol. 38, No. 10; Oct. 1999, pp. 1748-1757.

Nguyen et al., "A Computationally Efficient Superresolution Image Reconstruction Algorithm", IEEE Transactions on Image Processing IEEE Service Center, Piscataway, NJ, US, vol. 10, No. 4; Apr. 1, 2001.

Park et al., "Super-Resolution Image Reconstruction: A Technical Overview", IEEE Signal Processing Magazine, IEEE, Service Center, Piscataway, NJ, US, vol. 20, No. 3; May 1, 2003, pp. 21-36.

* cited by examiner

METHOD FOR THE THREE-DIMENSIONAL DIGITIZATION OF BOOKS USING TERAHERTZ RADIATION

CROSS REFERENCE TO RELATED APPLICATIONS

This application is the U.S. National Stage of PCT/FR2009/052131 filed Nov. 4, 2009, which in turn claims priority to French Application No. 0857524, filed Nov. 5, 2008. The contents of both applications are incorporated herein by reference in their entirety.

STATE OF THE ART

The present invention relates to a process for digitizing closed books, documents which are fragile or difficult to separate, bound or in batches, manuscripts, painted or printed without having to be opened, separated or handled, by means of a high-resolution three-dimensional imaging system by electromagnetic waves in the Terahertz field (THz).

Hereinbelow, the Terahertz field will designate the field of electromagnetic waves whereof the wavelength is between 30 μm and 3 mm.

BACKGROUND OF THE INVENTION

The inventors have identified a real need for scanning or digitizing closed books, documents which are fragile or difficult to separate, bound or in batches, manuscripts, painted or printed without having to be opened or handled. In fact, due to their extreme fragility, it is imperative for some works to be kept closed and shielded from any destructive electromagnetic radiation which might alter their contents (for example, high-energy ionising rays). Also, there can be a considerable gain in time in digitizing if the pages of the book do not need to be turned.

Accordingly, the present invention applies in particular to the digitizing of printed documents, bound or in batches, comprising a plurality of printed pages superposed on each other.

In general, a printed document comprises a substrate (paper pages) on which is deposited a material (ink) defining information (in the form of an image or text) to be captured or extracted.

For this information to be captured, it is essential to release sufficient contrast (that is, observe sufficient difference in transmission or reflection of the waves) between the substrate and the ink of the document in question. Therefore, the contrast constitutes an essential parameter for digitizing printed documents.

The resolution constitutes another essential parameter for digitizing printed documents, so as to ensure the faithfulness of the digitizing with the information contained in the document, and for example to make a reproduction of this document.

In fact, the spatial digitizing resolution of an imaging system is the distance between two points of the object to be digitized, such that this distance corresponds to the dimension of the smallest element of the image recorded by this imaging system. In other words, the spatial resolution of an imaging system defines the fineness of details which it is possible to record. The level of detail recorded is all the higher the finer the spatial resolution of the system.

The inventors have noticed that THz waves are particularly well adapted to the particular application described hereinabove, to the extent where they produce a sufficient level of contrast between the substrate and the ink, benefiting from spatial resolution compatible with the fineness of the characters to be acquired on the pages of the printed and bound documents.

According to the inventors, the THz waves are the only electromagnetic waves which simultaneously have:
- sufficient penetration power of waves through the material constituting the substrate of the ink,
- contrast between the substrate and the ink exploitable for extracting the information; and
- non-ionising radiation enabling use in an unprotected environment The maximal theoretical spatial resolution Δl of an imaging system 3D limited by the phenomenon of diffraction is calculated according to the following formula:

$$\Delta l = 0.61 \frac{\lambda}{ON} \text{(Rayleigh criterion)}$$

where λ designates the wavelength of the electromagnetic radiation in question in the imaging system and ON designates the digital opening of the imaging system.

In this way, the use of THz waves of wavelength between 30 μm and 3 mm enables an imaging system to reach maximal theoretical spatial resolution Δl between 36.6 μm and 3.66 mm, which is close to spatial resolutions relative to the standard size of information elements normally found on printed documents. In practice, the elements making up the characters or letters of a book are of a dimension of the order of a few hundreds of micrometers.

Current THz 3D imaging systems, an example of which is described in U.S. Pat. No. 7,119,339, do not attain this maximal theoretical spatial resolution, due to the fact that commercially available THz systems have a spatial resolution limited by their signal-to-noise ratio for the relevant frequency or by the dimension of the source and of the detector.

In an optical digitizing system it is known for the resolution of the detector (which corresponds to the physical size of the resolution element of the detector once converted to the object to be digitized by means of the enlargement of the optical system) to generally limit the spatial digitizing resolution of the system.

In particular, within the scope of the particular application described above, current imaging systems do not distinguish two consecutive pages of a book kept closed. For this, it is necessary for the system to provide spatial resolution of the improved digitized images in the dimension corresponding to the thickness of the book, relative to the spatial resolution obtained in the dimension of width or length of the book. Also, to correctly distinguish the characters printed on a page, it is therefore necessary to increase the spatial resolution of THZ 3D digitizing systems.

AIM AND SUMMARY OF THE INVENTION

The present invention proposes a solution which does not have the disadvantages of imaging systems of the prior art by introducing super-resolution digital processing in 3D applied to a set of 3D images acquired under certain conditions to produce a 3D image of greater spatial resolution (super-resolved 3D image).

By way of advantage, super-resolution processing produces the highest limits possible by the physical without as such modifying the physical resolution of the THz detectors.

The invention applies in particular to the field of digitizing without opening or separating printed documents, bound or in batches, and also fragile documents which cannot be handled, such as old books or manuscripts which can be digitized while remaining closed.

These aims are attained according to the invention by a process for digitizing closed books without having to open them, printed documents or manuscripts, bound or in batches, without having to separate them, by means of an imaging system of a three-dimensional object by Terahertz waves comprising the acquisition by a THz acquisition subsystem of a set of low-resolution three-dimensional images ($\{A_{uvw}\}$) representative of said object, said 3D low-resolution images being obtained by application of shifts in three-dimensional translation X, Y, Z in an orthogonal marker $\mathfrak{R}$ (O; X, Y, Z) according to which the object and said Thz acquisition subsystem are relatively shifted relative to each other, said process being characterised in that during said three-dimensional shifts, the amplitude ($M_X$, $M_Y$, $M_Z$) in each of these three dimensions of relative shifts is less than the spatial resolution of said THz acquisition subsystem corresponding to each of these three dimensions and in that said process also comprises a super-resolution three-dimensional processing step capable of generating a super-resolved 3D image ($I_{SR}$) from a linear combination of said 3D low-resolution images and an image-restoration step capable of generating a restored super-resolved 3D image ($J_{SR}$) from deconvolution by the point spread function (PSF) calculated from said 3D super-resolution image ($I_{SR}$).

Super-resolution 3D digital processing according to the invention "corrects" anisotropy of the spatial resolution (for example in the dimension Z).

Thus, the process according to the invention more easily isolates the fine pages of a book (in dimension Z) in the case of the superposition of 2D images (each corresponding to a 2D section) to generate a 3D image.

Said amplitude of said relative shift is preferably equal to the ratio of the spatial resolution ($rA_x$, $rA_y$, $rA_z$) of said THz acquisition subsystem by a super-resolution factor (FSR; $FSR_X$, $FSR_Y$, $FSR_Z$).

Said linear combination of said 3D images is determined by the following equation:

$$I_{SR}(i+a, j+b, k+c) = \frac{1}{FSR_X * FSR_Y * FSR_Z} \left[ \begin{array}{l} \sum_{u=0}^{a}\sum_{v=0}^{b}\sum_{w=0}^{c} A_{uvw}(p, q, r) + \\ \sum_{u=a+1}^{FSR_X-1}\sum_{v=0}^{b}\sum_{w=0}^{c} A_{uvw}(p-1, q, r) + \\ \sum_{u=0}^{a}\sum_{v=b+1}^{FSR_Y-1}\sum_{w=0}^{c} A_{uvw}(p, q-1, r) + \\ \sum_{u=a+1}^{FSR_X-1}\sum_{v=b+1}^{FSR_Y-1}\sum_{w=0}^{c} A_{uvw}(p-1, q-1, r) + \\ \sum_{u=0}^{a}\sum_{v=0}^{b}\sum_{w=c+1}^{FSR_Z-1} A_{uvw}(p, q, r-1) + \\ \sum_{u=a+1}^{FSR_X-1}\sum_{v=0}^{b}\sum_{w=c+1}^{FSR_Z-1} A_{uvw}(p-1, q, r-1) + \\ \sum_{u=0}^{a}\sum_{v=b+1}^{FSR_Y-1}\sum_{w=c+1}^{FSR_Z-1} A_{uvw}(p, q-1, r-1) + \\ \sum_{u=a+1}^{FSR_X-1}\sum_{v=b+1}^{FSR_Y-1}\sum_{w=c+1}^{FSR_Z-1} A_{uvw}(p-1, q-1, r-1) \end{array} \right]$$

where:

$I_{SR}$ designates the super-resolved 3D image of dimensions $N_X$, $N_Y$, $N_Z$;

$FSR_X$, $FSR_Y$, $FSR_Z$ designate the super-resolution factors according to X, Y and Z in an orthonormal marker $\mathfrak{R}$ (O; X, Y, Z), whereof the values are natural whole numbers greater than or equal to 1;

$I_{SR}(i+a, j+b, k+c)$ designates the voxel of the image $I_{SR}$ located at the coordinate i+a of the dimension X, the coordinate j+b of the dimension Y and the coordinate k+c of the dimension Z of the matrix $I_{SR}$, with i a multiple of $FSR_X$ such as $0 \le i < Nx$, j a multiple of $FSR_Y$ such as $0 \le j < Ny$, k a multiple of $FSR_Z$ such as $0 \le k < Nz$, and with a, b, c whole variables such that they take their values in the set 0, 1, 2, ..., $FSR_X-1$ (respectively $FSR_Y-1$, $FSR_Z-1$);

$\{A_{uvw},$ with $0 \le u < FSR_X; 0 \le v < FSR_Y; 0 \le w < FSR_Z\}$ is the set of 3D low-resolution images, where u, v, w represent the index of the position of the image in respectively the X, Y and Z dimensions;

$A_{uvw}(p, q, r)$ designates the voxel of the image $A_{uvw}$ located at the coordinate p of the dimension X, the coordinate q of the dimension Y and the coordinate r of the dimension Z of the matrix $A_{uvw}$, with $$p = \frac{i}{FSR_X}; \quad q = \frac{j}{FSR_Y}; \quad r = \frac{k}{FSR_Z}.$$

The preceding linear combination operation introduces a blur to the image $I_{SR}$ which has to be corrected. This blur corresponds to a convolution by a point spread function (Point Spread Function or PSF).

Said super-resolution factor is preferably identical (FSR) in each of the three dimensions.

Another aim of the invention is a computer program on an information substrate, this program being capable of being run by a processor of a computer or similar, this program comprising code instructions adapted for executing the steps of a process of the invention such as described hereinabove.

This program can utilise any programming language, and be in the form of source code, target code, or intermediate code between code source and target code, such as in a partially compiled form, or in any other preferred form.

Another aim of the invention is an information-recording substrate readable by a computer, and comprising instructions of a computer program such as mentioned hereinabove.

The recording substrate can be any entity or device capable of storing the computer program. For example, the substrate can comprise storage means such as a ROM read-only memory, for example a CD-ROM/DVD or a ROM microelectronic circuit, or even magnetic recording means, for example a diskette (floppy disc) or hard drive.

Also, the recording substrate can be a transmissible substrate such as an electric or optical signal which can be conveyed via an electric or optical cable, by radio or by other means. The program according to the invention can in particular be downloaded on a network of Internet type.

Alternatively, the recording substrate can be an integrated circuit incorporating the computer program, the circuit being adapted to execute or be utilised in the execution of the process in question.

BRIEF DESCRIPTION OF THE DIAGRAMS

Figure 2:
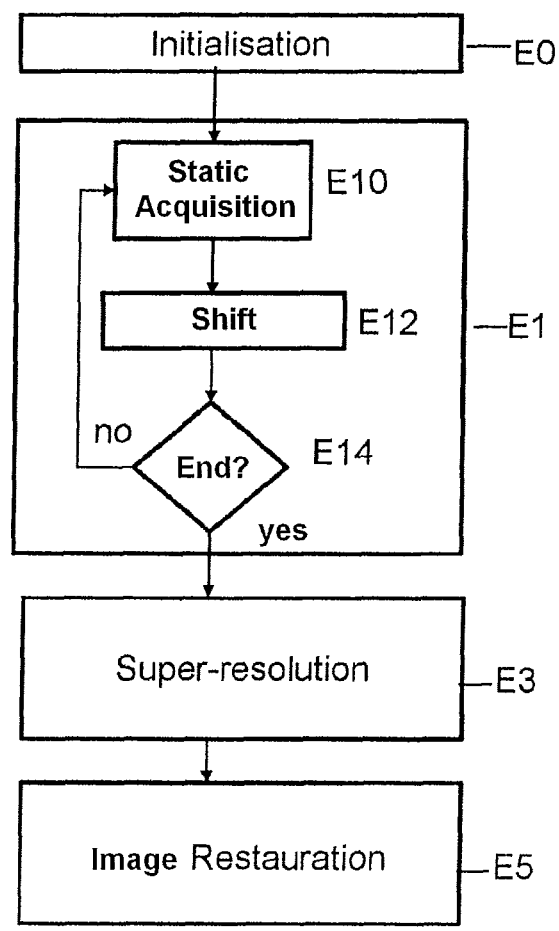
Figure 3:
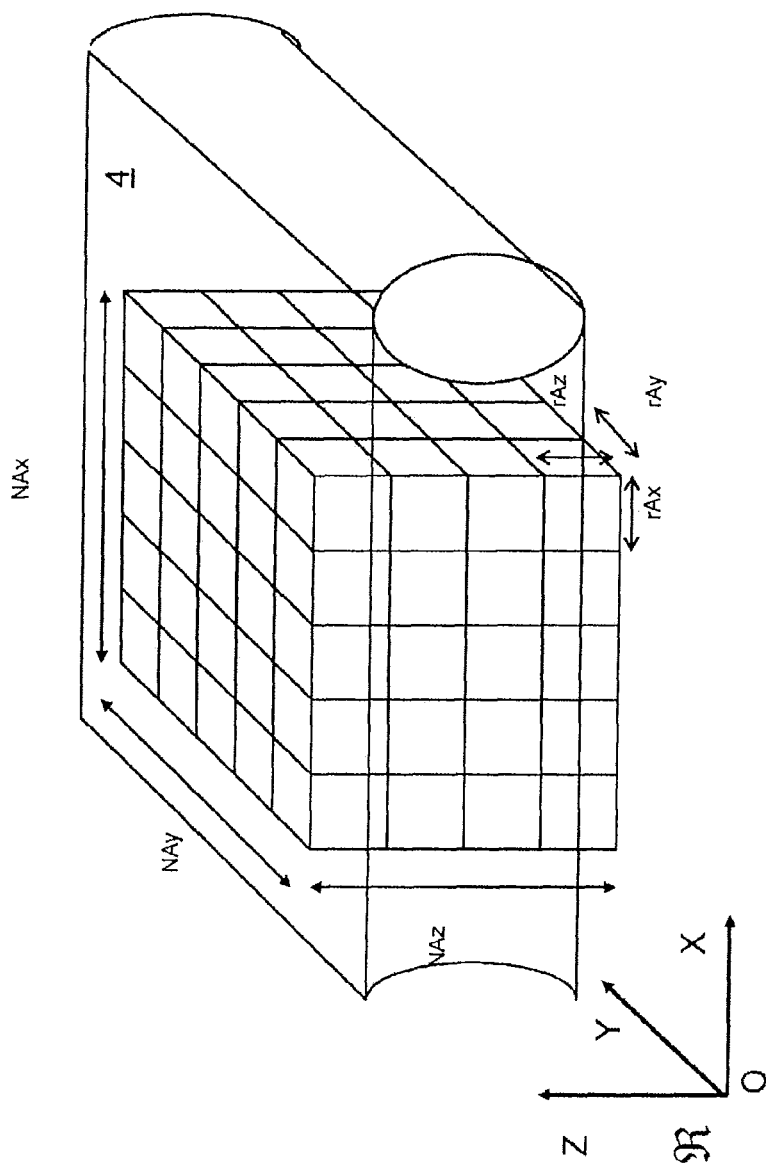
Figure 4:
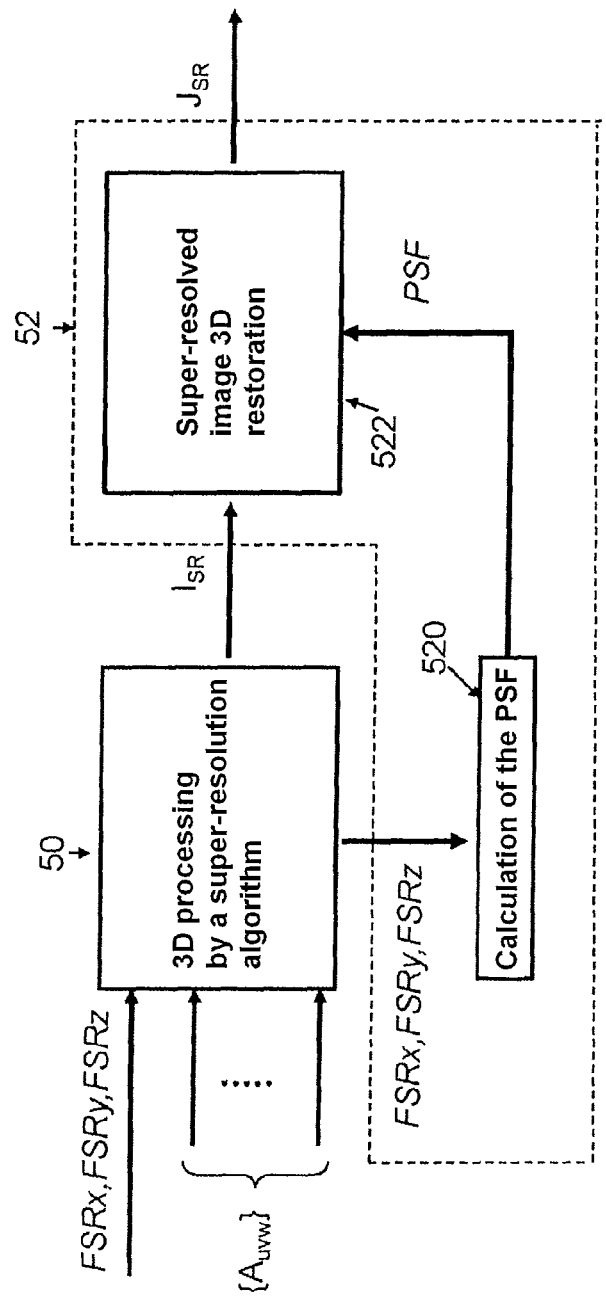
Figure 5:
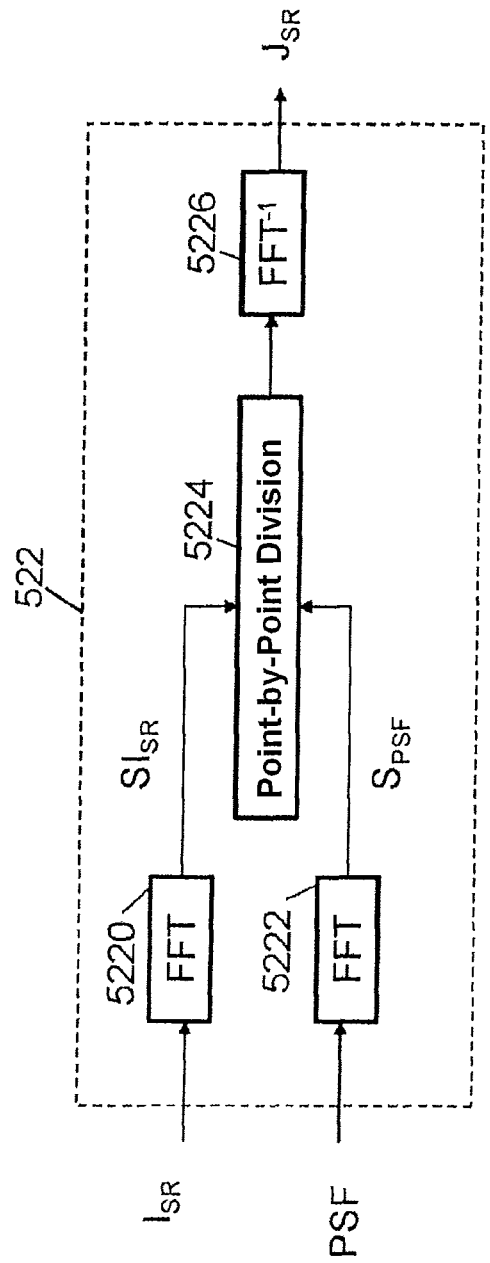

Other characteristics and advantages of the present invention will emerge from the following description, in reference to the attached diagrams which illustrate an embodiment thereof devoid of any limiting character and in which:

FIG. 1 schematically illustrates an embodiment of the 3D imaging system with THz waves according to the invention;

FIG. 2 illustrates in the form of an organigram the steps of the process for digitizing books according to the invention;

FIG. 3 schematically illustrates a book and a low-resolution image in matrix form, in the marker $\Re$ (O; X, Y, Z);

FIG. 4 schematically illustrates an embodiment of the image-processing subsystem by 3D super-resolution according to the invention; and FIG. 5 schematically illustrates an embodiment of an element of the image-restoration module.

DETAILED DESCRIPTION OF AN EMBODIMENT

FIG. 1 schematically illustrates a three-dimensional (3D) imaging system 1 with Terahertz waves (THz) according to an embodiment of the present invention.

The imaging system 1 is constituted by a THz acquisition subsystem 2 of three-dimensional images coupled to an image-processing subsystem 5 by 3D super-resolution.

The acquisition subsystem 2 is a conventional device capable of carrying out acquisition of a set of 3D images representative of an object 4 to be scanned. In a known manner, the acquisition subsystem 2 comprises especially a THz source of waves 20 and a THz wave detector 22 adapted to said source 20.

An embodiment of the acquisition subsystem 2 is described in U.S. Pat. No. 7,119,339. The expert could naturally consider any other acquisition system 2 of 3D images with THz waves capable of providing a set of 3D images, within the scope of the present invention.

The imaging system 1 according to the invention also comprises a module of super-resolution shifts 3 adapted for shifting the object 4 relative to the acquisition subsystem 2 to create a super-resolution shift. This shift is carried out by translations according to directions X, Y, Z of an orthonormal marker $\Re$ (O; X, Y, Z) of origin O comprising three orthogonal axes X, Y, Z.

The super-resolution shift module 3 comprises a plate 30 (or mobile platen), on which the object to be scanned 4 rests. The plate 30 is driven by a motor 32 which is in turn controlled by means of a control module 34. The control module 34 is capable of determining a series of shifts in the three dimensions X, Y and Z applying to the object 4 sequentially, whereof the characteristics are functions of a super-resolution factor FSR previously selected by the user.

The imaging system 1 according to the invention also comprises an image-processing subsystem 5 connected to the acquisition subsystem 2 and to the super-resolution shift module 3.

The image-processing subsystem 5 comprises an image-processing module 50 by 3D super-resolution and a super-resolved image-restoring module 52.

The processing module 50 comprises software means adapted to generate a super-resolved 3D image $I_{SR}$ from the set of 3D images acquired $\{A_{uvw}\}$ by the acquisition subsystem 2 during the sequence of super-resolution shifts.

The resulting 3D images $\{A_{uvw}\}$ having a spatial resolution lower in each dimension than the super-resolved image $I_{SR}$ will be qualified as low-resolution throughout the description.

The restoration module 52 comprises software means adapted to supply a restored super-resolved image $J_{SR}$ from the super-resolved image $I_{SR}$ supplied on completion of the processing module 50.

The imaging process according to the invention implementing the imaging system 1 will now be described in reference to FIGS. 2 and 3.

As illustrated in FIG. 3, the object 4 to be digitized is a book comprising a plurality of bound and printed pages, this book 4 being kept closed throughout the imaging process according to the invention.

During a previous initialisation step E0, an operator proceeds with calibration of the imaging system 1. For this, referencing is conducted without the book 4 which is then positioned in a reference position P1 noted (0, 0, 0) in the marker $\Re$.

As a function of a super-resolution factor FSR the control module 34 determines a set of shifts to be applied to the book 4 in the three dimensions, defining a plurality of positions $P_1$, $P_2$, $P_3$, ..., $P_K$ of the book 4. At this stage, the imaging system 1 is calibrated.

The super-resolution factor FSR is an essential parameter of the process according to the invention. This factor defines the gain in spatial resolution obtained by the super-resolution operation relative to the low-resolution images and is utilised especially to determine the total number of 3D low-resolution images to be acquired by the acquisition subsystem 2 and therefore the number of positions. The value of the super-resolution factor FSR is a natural whole number greater than or equal to 1. For example, assuming that the spatial resolution $rA_z$ of a low-resolution image according to the axis Z is equal to 1 mm, and that the thickness h of a page of the book 4 is about equal to 80 µm, the user then chooses FSR=13 as calculated according to the formula hereinbelow:

$$FSR = \text{Int}\left(\frac{rA_z}{h}\right) + 1 = \text{Int}\left(\frac{1}{0.08}\right) + 1 = 13$$

where Int designates the function "whole part".

In this way, in practice, a value of FSR close to 13 is necessary for scanning the pages of the book 4.

It is evident that the super-resolution factor FSR can be distinct for each relevant dimension. In this case, the factors $FSR_X$, $FSR_Y$ and $FSR_Z$ which correspond respectively to the super-resolution factors in the dimensions X, Y and Z are introduced.

In keeping with the present invention, the shifts determined by the control module 34 are such that their amplitude (or "pitch") is less than the spatial resolution of the acquisition subsystem 2. In practice, the amplitude of these shifts corresponds to a fraction of the spatial resolution of the acquisition subsystem 2.

The amplitude $M_X$, $M_Y$, $M_Z$ of the shifts in translation according to the dimensions X, Y, Z is respectively defined by:

$$M_X = \frac{rA_X}{FSR_X}; \quad M_Y = \frac{rA_Y}{FSR_Y}; \quad M_Z = \frac{rA_z}{FSR_Z}$$

where $rA_X$, $rA_Y$, $rA_Z$ represent the spatial resolutions of a low-resolution image in the dimensions X, Y, Z respectively.

By way of illustrative and non-limiting example, we now consider the case where $FSR=FSR_X=FSR_Y=FSR_Z=2$, with the sole aim of simplifying calculations in the following description.

In this case, the control module 34 determines that the amplitudes of the shifts (translations) to be applied in the directions X, Y, and Z are respectively:

$$M_X = \frac{rA_X}{2}; \quad M_Y = \frac{rA_Y}{2}; \quad M_Z = \frac{rA_z}{2}$$

At this stage and for these FSR values, the imaging system 1 according to the invention is calibrated.

During an acquisition step E1, the set of 3D images noted $\{A_{uvw}\}$ is obtained by the acquisition subsystem 2, during a sequence of shifts of the book 4 relative to the acquisition subsystem 2 according to the shifts previously determined by the control module 34.

The acquisition step E1 evolves according to the following sub-steps. During a static sub-acquisition step E10, the acquisition subsystem 2 acquires a 3D image of the book 4 in a given position. During a shift sub-step E12, the control module 34 causes the shift of the plate 30 on which the book 4 rests according to a previously calculated shift, defining a new position of the book 4. The sub-steps of static acquisition E10 and shift E12 are reiterated, inasmuch as there are shifts previously defined to be applied to the book (negative test step E14).

On completion of the acquisition step (positive test step E14), a number $FSR_X \times FSR_Y \times FSR_Z$ of 3D low-resolution images $A_{uvw}$ has been acquired by the acquisition subsystem 2. This number of images $FSR_X \times FSR_Y \times FSR_Z$ corresponds to the number of positions of the book 4, given that the acquisition subsystem 2 acquires a low-resolution 3D image $A_{uvw}$, where u, v, w represent respectively the indices of the shifts in the directions X, Y and Z, for each position occupied by the book 4.

The different coordinates of the positions are determined in the marker $\mathfrak{R}$ (O; X, Y, Z) by the formula:

$$\left( u \times \frac{rA_X}{FSR_X}, v \times \frac{rA_Y}{FSR_Y}, w \times \frac{rA_Z}{FSR_Z} \right),$$

with $0 \leq u < FSR_X$; $0 \leq v < FSR_Y$; $0 \leq w < FSR_Z$

In the case where FSR=2, the number of positions is equal to FSR^3 that is 8 as indicated in table 1 hereinbelow. Featured on each line of this table 1 is a position identified by a triplet of Cartesian coordinates in the marker $\mathfrak{R}$, in association with a low-resolution 3D image $A_{uvw}$ where u, v, w represent respectively the offset in the directions X, Y and Z.

TABLE 1

| Position # | (X, Y, Z) | $A_{uvw}$ |
|---|---|---|
| Position 1 | (0, 0, 0) | $A_{000}$ |
| Position 2 | $\left(\frac{rA_x}{2}, 0, 0\right)$ | $A_{100}$ |
| Position 3 | $\left(\frac{rA_x}{2}, \frac{rA_y}{2}, 0\right)$ | $A_{110}$ |
| Position 4 | $\left(\frac{rA_x}{2}, \frac{rA_y}{2}, \frac{rA_z}{2}\right)$ | $A_{111}$ |
| Position 5 | $\left(0, \frac{rA_y}{2}, \frac{rA_z}{2}\right)$ | $A_{011}$ |
| Position 6 | $\left(0, 0, \frac{rA_z}{2}\right)$ | $A_{001}$ |
| Position 7 | $\left(\frac{rA_x}{2}, 0, \frac{rA_z}{2}\right)$ | $A_{101}$ |
| Position 8 | $\left(0, \frac{rA_y}{2}, 0\right)$ | $A_{010}$ |

During a processing step E3 by 3D super-resolution, the set of the low-resolution 3D images $\{A_{uvw}\}$ is processed by the processing module 50 of 3D super-resolution so as to generate the super-resolved 3D image $I_{SR}$.

During an image-restoration step E5, the super-resolved 3D image is corrected by the restoration module 52, so as to generate the restored super-resolved 3D image $J_{SR}$.

The processing step E3 and the image-restoration step E5 will now be described in detail in reference to FIG. 3.

In general, each low-resolution image $A_{uvw}$ is represented in the form of a three-dimensional matrix, of dimension $NA_X$, $NA_Y$ and $NA_Z$ according to the axes X, Y, Z of the orthonormal marker $\mathfrak{R}$.

$A_{uvw}$ (p, q, r) designates the image element (volumetric pixel or voxel) located at the coordinate p of the dimension X, the coordinate q of the dimension Y and the coordinate r of the dimension Z of the matrix $A_{uvw}$. The spatial resolution of the image $A_{uvw}$ is characterised in the three dimensions by the spatial resolutions ($rA_X$, $rA_Y$, $rA_Z$) of the acquisition subsystem 2 respectively according to the axes X, Y, Z of the marker $\mathfrak{R}$. For example, $rA_X = rA_Y = rA_Z = 1$ mm.

The super-resolved 3D image $I_{SR}$ is represented in the form of a three-dimensional matrix, of dimension $N_X$, $N_Y$ and $N_Z$ according to the axes X, Y, Z of the orthonormal marker $\mathfrak{R}$. To simplify the description, the case is considered where $N_X = N_Y = N_Z = N$ and the super-resolved image $I_{SR}$ is represented by a cubic matrix of dimension N×N×N, where N designates a non-zero natural whole number.

Each matrix element $I_{SR}(i+a, j+b, k+c)$ designates the voxel of the super-resolved 3D image $I_{SR}$ located at the coordinate i+a of the dimension X, the coordinate j+b of the dimension Y and the coordinate k+c of the dimension Z of the matrix, with i, j, k designating multiple natural whole numbers of the value of the super-resolution factor FSR and such that $0 \leq i, j, k < N$, and with a, b, c whole variables such as they take their values in the set 0, 1, 2, ..., FSR−1.

The spatial resolution of the image $I_{SR}$ is characterised in the three dimensions by the spatial resolutions ($r_X$, $r_Y$, $r_Z$) respectively according to the axes X, Y, Z of the orthonormal marker $\mathfrak{R}$.

In general, the super-resolved image $I_{SR}$ has a resolution improved by a factor $FSR_X$, $FSR_Y$, $FSR_Z$ in the dimensions X, Y, Z respectively, relative to the resolution of the images $A_{uvw}$. The relation between the spatial resolution ($r_X$, $r_Y$, $r_Z$) of the super-resolved image $I_{SR}$ and the spatial resolution ($rA_X$, $rA_Y$, $rA_Z$) of an image $A_{uvw}$ is given by:

$$r_X = \frac{rA_X}{FSR_X}; r_X = \frac{rA_Y}{FSR_Y}; r_Z = \frac{rA_Z}{FSR_Z}.$$

In this way, in the case where $FSR_X = FSR_Y = FSR_Z = FSR = 2$, the spatial resolution ($r_X$, $r_Y$, $r_Z$) of the super-resolved image $I_{SR}$ is improved by a factor FSR=2 relative to the spatial resolution ($rA_X$, $rA_Y$, $rA_Z$) of the images $A_{uvw}$.

The super-resolved 3D image comprises in total $FSR_X \times FSR_Y \times FSR_Z$ more voxels than each image $A_{uvw}$ ($FSR_X$ times more in the dimension X, $FSR_Y$ times more in the dimension Y and $FSR_Z$ times more in the dimension Z). In this way, in the particular case where $FSR_X = FSR_Y = FSR_Z = FSR = 2$, there are 8 times more voxels in the image $I_{SR}$ than in each image $A_{uvw}$.

According to the present invention, the super-resolved 3D image $I_{SR}$ is obtained by combining the set of 3D low-resolution images $A_{uvw}$ as indicated in the equation 1 hereinbelow (case where $FSR_X = FSR_Y = FSR_Z = FSR$). From a mathematical viewpoint, the super-resolved 3D image $I_{SR}$ is a linear combination of $FSR^3$ 3D images $A_{uvw}$.

$$I_{SR}(i+a, j+b, k+c) = \qquad \text{Equation 1}$$

$$\frac{1}{FSR^3}\begin{bmatrix} \sum_{u=0}^{a}\sum_{v=0}^{b}\sum_{w=0}^{c} A_{uvw}(p, q, r) + \\ \sum_{u=a+1}^{FSR-1}\sum_{v=0}^{b}\sum_{w=0}^{c} A_{uvw}(p-1, q, r) + \\ \sum_{u=0}^{a}\sum_{v=b+1}^{FSR-1}\sum_{w=0}^{c} A_{uvw}(p, q-1, r) + \\ \sum_{u=a+1}^{FSR-1}\sum_{v=b+1}^{FSR-1}\sum_{w=0}^{c} A_{uvw}(p-1, q-1, r) + \\ \sum_{u=0}^{a}\sum_{v=0}^{b}\sum_{w=c+1}^{FSR-1} A_{uvw}(p, q, r-1) + \\ \sum_{u=a+1}^{FSR-1}\sum_{v=0}^{b}\sum_{w=c+1}^{FSR-1} A_{uvw}(p-1, q, r-1) + \\ \sum_{u=0}^{a}\sum_{v=b+1}^{FSR-1}\sum_{w=c+1}^{FSR-1} A_{uvw}(p, q-1, r-1) + \\ \sum_{u=a+1}^{FSR-1}\sum_{v=b+1}^{FSR-1}\sum_{w=c+1}^{FSR-1} A_{uvw}(p-1, q-1, r-1) \end{bmatrix}$$

where:

$I_{SR}$ designates the super-resolved image of dimension N×N×N;

FSR designates the super-resolution factor, whereof the value is a natural whole number greater than or equal to 1;

$I_{SR}(i+a, j+b, k+c)$ designates the voxel of the image $I_{SR}$ located at the coordinate i+a of the dimension X, the coordinate j+b of the dimension Y and the coordinate k+c of the dimension Z of the matrix $I_{SR}$, with i, j, k multiples of FSR, such that 0≤i, j, k<N, and with a, b, c whole variables such that they take their values in the set 0, 1, 2, ..., FSR−1;

$\{A_{uvw}, 0 \le u, v, w < FSR\}$ is the set of low-resolution 3D images, where u, v, w represents respectively the index of the position of the image in respectively the directions X, Y and Z;

$A_{uvw}(p, q, r)$ designates the voxel of the image $A_{uvw}$ located at the coordinate p of the dimension X, the coordinate q of the dimension Y and the coordinate r of the dimension Z of the matrix $A_{uvw}$, with $$p = \frac{i}{FSR}; q = \frac{j}{FSR}; r = \frac{k}{FSR}.$$

In this way, along the axis X, the super-resolved image $I_{SR}$ has $N_X = NA_X \times FSR$ points whereof the coordinates (whole) move through the set $[0, N_X-1]$, with $N_X = N$. The variable i moves through these coordinates by blocks of FSR points. The successive values of i are therefore i=0, FSR, 2×FSR, 3×FSR, ..., $(NA_X-1) \times FSR$. The whole variable $a \in \{0, 1, 2, ..., FSR-1\}$ is such that i+a defines the set of points of the matrix $I_{SR}$ according to the axe X, with $(i+a) \in \{0, 1, 2, ..., N_X-1\}$. The whole variables (j, b) and (k, c) play the same role as (i, a) according to the axes Y and Z respectively.

More generally, the case can be considered where the super-resolution factor FSR is different for each relevant dimension. In this case, the factors $FSR_X$, $FSR_Y$, $FSR_Z$ which correspond respectively to the factors of super-resolution in the dimensions X, Y and Z are introduced to the equation (1), giving the equation (2) hereinbelow:

$$I_{SR}(i+a, j+b, k+c) = \frac{1}{FSR_X * FSR_Y * FSR_Z} \qquad \text{Equation 2}$$

$$\begin{bmatrix} \sum_{u=0}^{a}\sum_{v=0}^{b}\sum_{w=0}^{c} A_{uvw}(p, q, r) + \\ \sum_{u=a+1}^{FSR_X-1}\sum_{v=0}^{b}\sum_{w=0}^{c} A_{uvw}(p-1, q, r) + \\ \sum_{u=0}^{a}\sum_{v=b+1}^{FSR_Y-1}\sum_{w=0}^{c} A_{uvw}(p, q-1, r) + \\ \sum_{u=a+1}^{FSR_X-1}\sum_{v=b+1}^{FSR_Y-1}\sum_{w=0}^{c} A_{uvw}(p-1, q-1, r) + \\ \sum_{u=0}^{a}\sum_{v=0}^{b}\sum_{w=c+1}^{FSR_Z-1} A_{uvw}(p, q, r-1) + \\ \sum_{u=a+1}^{FSR_X-1}\sum_{v=0}^{b}\sum_{w=c+1}^{FSR_Z-1} A_{uvw}(p-1, q, r-1) + \\ \sum_{u=0}^{a}\sum_{v=b+1}^{FSR_Y-1}\sum_{w=c+1}^{FSR_Z-1} A_{uvw}(p, q-1, r-1) + \\ \sum_{u=a+1}^{FSR_X-1}\sum_{v=b+1}^{FSR_Y-1}\sum_{w=c+1}^{FSR_Z-1} A_{uvw}(p-1, q-1, r-1) \end{bmatrix}$$

where:

$I_{SR}$ designates the super-resolved image of dimension $N_X$, $N_Y$, $N_Z$;

$FSR_X$, $FSR_Y$, $FSR_Z$ designate the super-resolution factors according to X, Y and Z in a orthonormal marker $\Re$ (O; X, Y, Z), whereof the values are natural whole numbers greater than or equal to 1;

$I_{SR}(i+a, j+b, k+c)$ designates the voxel of the image $I_{SR}$ located at the coordinate i+a of the dimension X, the coordinate j+b of the dimension Y and the coordinate k+c of the dimension Z of the matrix $I_{SR}$, with i a multiple of $FSR_X$ such as $0 \le i < N_X$, j a multiple of $FSR_Y$ such as $0 \le j < N_Y$, k a multiple of $FSR_Z$ such as $0 \le k < N_Z$, and with a, b, c des whole variables such that they take their values in the set 0, 1, 2, ..., $FSR_X-1$ (respectively $FSR_Y-1$, $FSR_Z-1$);

$\{A_{uvw}, \text{with } 0 \le u < FSR_X; 0 \le v < FSR_Y; 0 \le w < FSR_Z\}$ is the set of 3D low-resolution images, where u, v, w represent the index of the position of the image in respectively the dimensions X, Y and Z;

$A_{uvw}(p, q, r)$ designates the voxel of the image $A_{uvw}$ located at the coordinate p of the dimension X, the coordinate q of the dimension Y and the coordinate r of the dimension Z of the matrix $A_{uvw}$, with $$p = \frac{i}{FSR_X}; q = \frac{j}{FSR_Y}; r = \frac{k}{FSR_Z}.$$

The inventors have noticed that the process of combining $FSR^3$ (or $FSR_X \times FSR_Y \times FSR_Z$) three-dimensional images according to the equation 1 (respectively equation 2) introduces a phenomenon of blur on the super-resolved image $I_{SR}$. SO it is appropriate to correct this blur on the super-resolved image $I_{SR}$ to improve the quality of this image.

For this to happen, the image-restoration step E5 conducted by the restoration module 52 will be described hereinbelow in detail in reference to FIGS. 4 and 5.

The phenomenon of blur noted in the super-resolved 3D image $I_{SR}$ is due to smoothing which can be described by the convolution by a matrix representing a point spread function called PSF: "Point Spread Function".

The PSF can be calculated in any known way.

The restoration module 52 comprises first software means 520 for calculating the PSF from the mathematical model involved in the super-resolution process according to the equation 1 or the equation 2 described hereinabove. The PSF is determined according to known digital filtering algorithms, using parameters specific to the super-resolution step E3, such as the super-resolution factor FSR^3 or ($FSR_X$, $FSR_Y$, $FSR_Z$).

More precisely, the point spread function is an average low-pass filter which corresponds to convolution by a 3D matrix of dimensions $FSR_X$, $FSR_Y$, $FSR_Z$ having uniform values:

$$I_{SR} = J_{SR} \otimes PSF$$

where $J_{SR}$ is the net image (without blur), $\otimes$ represents a convolution product, and PSF is a matrix of dimensions $FSR_X \times FSR_Y \times FSR_Z$ whereof the values are uniform and equal at each point to the value $$\frac{1}{FSR_X \times FSR_Y \times FSR_Z}.$$

For example, in the case where $FSR_X = FSR_Y = 2$ and $FSR_Z = 1$, the PSF is given by:

$$PSF = \frac{1}{4} \times \begin{bmatrix} 1 & 1 \\ 1 & 1 \end{bmatrix}$$

The restoration module 52 also comprises second software means 522 for deconvoluting the super-resolved image $I_{SR}$ by means of the average low-pass filter (PSF) calculated previously. More particularly, as illustrated in the example of FIG. 5, it comprises a first module 5220 of Fourier transform which provides a spectrum $SI_{SR}$ of the super-resolved image $I_{SR}$ according to an algorithm of type FFT ("Fast Fourier Transform"), a second module 5222 of Fourier transform provides a frequential response $S_{PSF}$ of the average low-pass filter (PSF) and a divider module 5224 effects point-by-point division of the spectrum $SI_{SR}$ of the super-resolved image $I_{SR}$ and of the frequential response $S_{PSF}$ to deliver a spectrum of the super-resolved image corrected in the Fourier field, to which is applied by means of a module 5226 of inverse Fourier transform an inverse Fourier transform according to an algorithm of type $FFT^{-1}$ to deliver the restored super-resolved image $J_{SR}$.

Even though the detailed description hereinabove relates to an embodiment in which the object 4 is shifted and the acquisition subsystem 2 is held opposite the source 20, it is clear that the invention applies also to an alternative embodiment in which the object is kept fixed and the acquisition subsystem set is shifted about the object.

The invention claimed is:

1. A process for digitizing closed books without having to open them, printed documents or manuscripts, bound or in batches, without having to separate them, using an imaging system of a three-dimensional object by Terahertz (THz) waves comprising:

acquiring by an THz acquisition subsystem a set of low-resolution three-dimensional images representative of said object, said low-resolution three-dimensional images being obtained by application of orthogonal shifts in three-dimensional translation according to which the object and the THz acquisition subsystem are relatively shifted relative to each other, wherein during said three-dimensional shifts, the amplitude of the relative shift in each of said three dimensions is less than the spatial resolution of said THz acquisition subsystem in each of said three dimensions; and performing a three-dimensional super-resolution processing step, capable of generating a super-resolved three-dimensional image from a linear combination of said low-resolution three-dimensional images and an image-restoration step capable of generating a restored super-resolved three-dimensional image from deconvolution by a point spread function of said super-resolved three-dimensional image, wherein said linear combination of said three-dimensional images is determined by the following equation:

$$I_{SR}(i+a, j+b, k+c) =$$

$$\frac{1}{FSR_X * FSR_Y * FSR_Z} * \begin{bmatrix} \sum_{u=0}^{a} \sum_{v=0}^{b} \sum_{w=0}^{c} A_{uvw}(p, q, r) + \\ \sum_{u=a+1}^{FSR_X-1} \sum_{v=0}^{b} \sum_{w=0}^{c} A_{uvw}(p-1, q, r) + \\ \sum_{u=0}^{a} \sum_{v=b+1}^{FSR_Y-1} \sum_{w=0}^{c} A_{uvw}(p, q-1, r) + \\ \sum_{u=a+1}^{FSR_X-1} \sum_{v=b+1}^{FSR_Y-1} \sum_{w=0}^{c} A_{uvw}(p-1, q-1, r) + \\ \sum_{u=0}^{a} \sum_{v=0}^{b} \sum_{w=c+1}^{FSR_Z-1} A_{uvw}(p, q, r-1) + \\ \sum_{u=a+1}^{FSR_X-1} \sum_{v=0}^{b} \sum_{w=c+1}^{FSR_Z-1} A_{uvw}(p-1, q, r-1) + \\ \sum_{u=0}^{a} \sum_{v=b+1}^{FSR_Y-1} \sum_{w=c+1}^{FSR_Z-1} A_{uvw}(p, q-1, r-1) + \\ \sum_{u=a+1}^{FSR_X-1} \sum_{v=b+1}^{FSR_Y-1} \sum_{w=c+1}^{FSR_Z-1} A_{uvw}(p-1, q-1, r-1) \end{bmatrix}$$

where:

$I_{SR}$ designates the super-resolved image of dimension $N_X$, $N_Y$, Nz;

$FSR_X$, $FSR_Y$, $FSR_Z$ designate the factors of super-resolution according to X, Y and Z in a orthonormal marker $\Re$ (O; X, Y, Z), whereof the values are natural whole numbers greater than or equal to 1;

$I_{SR}$(i+a, j+b, k+c) designates the voxel of the image $I_{SR}$ located at the coordinate i+a of the dimension X, the coordinate j+b of the dimension Y and the coordinate k+c of the dimension Z of the matrix $I_{SR}$, with i a multiple of $FSR_X$ such as $0 \leq i < N_X$, j a multiple of $FSR_Y$ such as $0 \leq j < N_Y$, k a multiple of $FSR_Z$ such as $0 \leq k < N_Z$, and with a, b, c whole variables such that they take their values in the set 0, 1, 2, . . . , $FSR_X-1$ (respectively $FSR_Y-1$, $FSR_Z-1$);

$\{A_{uvw}$, with $0 \leq u < FSR_X$; $0 \leq v < FSR_Y$ $0 \leq w < FSR_Z\}$ is the set of 3D low-resolution images, where u, v, w represent the index of the position of the image in respectively the dimensions X, Y and Z;

$A_{uvw}(p, q, r)$ designates the voxel of the image $A_{uvw}$ located at the coordinate p of the dimension X, the coordinate q of the dimension Y and the coordinate r of the dimension Z of the matrix $A_{uvw}$, with $$p = \frac{i}{FSR_X}; q = \frac{j}{FSR_Y}; r = \frac{k}{FSR_Z}.$$

2. The process as claimed in claim 1, wherein said amplitude of said relative shift is equal to the ratio of the spatial resolution of said THz acquisition subsystem by a super-resolution factor.

3. The process as claimed in claim 2, wherein said super-resolution factor is identical in each of the three dimensions.

4. A computer program stored on a non-transitory computer readable storage medium comprising code instructions for execution of the steps of the process for digitizing books as claimed in claim 1.

5. A non-transitory computer readable storage medium readable by a processor on which is recorded a computer program comprising code instructions for execution of the steps of the process for digitizing books as claimed in claim 1.

* * * * *